(12) United States Patent
Han et al.

(10) Patent No.: US 11,019,124 B2
(45) Date of Patent: May 25, 2021

(54) SCREEN MIRRORING METHOD AND APPARATUS THEREOF

(71) Applicant: Samsung Electronics Co., Ltd., Gyeonggi-do (KR)

(72) Inventors: Se-Hee Han, Seoul (KR); Ho-Yeon Park, Seoul (KR)

(73) Assignee: Samsung Electronics Co., Ltd

( * ) Notice: Subject to any disclaimer, the term of this patent is extended or adjusted under 35 U.S.C. 154(b) by 319 days.

(21) Appl. No.: 13/771,959

(22) Filed: Feb. 20, 2013

(65) Prior Publication Data

US 2013/0219072 A1  Aug. 22, 2013

(30) Foreign Application Priority Data

Feb. 20, 2012  (KR) ........................ 10-2012-0017021

(51) Int. Cl.
*H04L 29/06*  (2006.01)

(52) U.S. Cl.
CPC .......... *H04L 65/60* (2013.01); *H04L 65/4084* (2013.01); *H04L 65/4092* (2013.01); *H04L 65/602* (2013.01); *H04L 65/608* (2013.01); *H04L 67/38* (2013.01)

(58) Field of Classification Search
CPC ..... G06F 21/00; H04L 65/60; H04L 65/4084; H04L 65/4092; H04L 65/602; H04L 65/608; H04L 67/38; H04L 69/40; H04L 67/303
See application file for complete search history.

(56) References Cited

U.S. PATENT DOCUMENTS

| | | | |
|---|---|---|---|
| 7,953,867 B1* | 5/2011 | Andreasen | H04L 65/1006 709/203 |
| 2007/0229518 A1 | 10/2007 | Kii et al. | |
| 2008/0016556 A1* | 1/2008 | Selignan | H04W 76/50 726/7 |
| 2009/0019492 A1* | 1/2009 | Grasset | 725/45 |
| 2009/0147146 A1 | 6/2009 | Lee et al. | |
| 2010/0088733 A1 | 4/2010 | Chan et al. | |
| 2010/0121942 A1 | 5/2010 | Ooi et al. | |
| 2011/0032338 A1* | 2/2011 | Raveendran et al. | 348/51 |

(Continued)

FOREIGN PATENT DOCUMENTS

| | | |
|---|---|---|
| CN | 101247386 | 8/2008 |
| CN | 101459804 | 6/2009 |

(Continued)

OTHER PUBLICATIONS

Schulzrinne et al., Real Time Streaming Protocol 2.0 (RTSP), Oct. 28, 2011, Version 28.*

(Continued)

*Primary Examiner* — Backhean Tiv
*Assistant Examiner* — Jihad K Boustany
(74) *Attorney, Agent, or Firm* — The Farrell Law Firm, P.C.

(57) ABSTRACT

A screen mirroring method of a source device is provided, including determining whether a reproduction operation of media content is requested while a screen mirroring operation is performed, when the reproduction operation of the media content is requested, streaming the media content to a sink device and stopping the reproduction operation of the media content.

10 Claims, 4 Drawing Sheets

(56) References Cited

U.S. PATENT DOCUMENTS

| | | | | |
|---|---|---|---|---|
| 2011/0047223 | A1* | 2/2011 | Naftali-Menajed | H04L 51/10 709/206 |
| 2011/0107388 | A1 | 5/2011 | Lee et al. | |
| 2011/0149806 | A1 | 6/2011 | Verma et al. | |
| 2012/0042102 | A1* | 2/2012 | Chung | H04M 1/7253 710/33 |
| 2012/0173749 | A1* | 7/2012 | Shah | 709/231 |
| 2013/0238702 | A1* | 9/2013 | Sheth | H04L 67/38 709/204 |
| 2014/0032635 | A1* | 1/2014 | Pimmel | H04M 1/7253 709/203 |
| 2016/0309211 | A1 | 10/2016 | Grasset | |

FOREIGN PATENT DOCUMENTS

| | | |
|---|---|---|
| CN | 101707876 | 5/2010 |
| CN | 102239695 | 11/2011 |
| JP | 2009-021698 | 1/2009 |
| KR | 1020090022613 | 3/2009 |
| KR | 1020110048457 | 5/2011 |
| KR | 1020110072105 | 6/2011 |
| KR | 1020110073239 | 6/2011 |
| WO | WO 2010/037104 | 4/2010 |

OTHER PUBLICATIONS

"Wi-Fi Alliance Member Symposium", XP055046396, Apr. 1, 2011, 326 pages.

European Search Report dated Sep. 25, 2015 issued in counterpart application No. 13751634.0-1853, 10 pages.

Chinese Office Action dated Oct. 28, 2016 issued in counterpart application No. 201380010137.9, 13 pages.

Korean Office Action dated Aug. 7, 2018 issued in counterpart application No. 10-2012-0017021, 7 pages.

Wuqiseu, "Details Explanation of WIFI Display Spec", Baidu, http://blog.sina.com.cn/s/blog_80ce3a550100ut7r.html, Nov. 17, 2011, 3 pages.

Chinese Office Action dated Nov. 16, 2020 issued in counterpart application No. 201810569975.4, 13 pages.

* cited by examiner

SCREEN MIRRORING METHOD AND APPARATUS THEREOF

PRIORITY

This application claims priority under 35 U.S.C. § 119(a) to an application filed in the Korean Intellectual Property Office on Feb. 20, 2012 and assigned Ser. No. 10-2012-0017021, the contents of which are incorporated herein by reference.

BACKGROUND OF THE INVENTION

1. Field of the Invention

The present invention relates generally to a screen mirroring method, and more particularly, to a screen mirroring method and apparatus suitable for use with a portable terminal to reduce battery consumption and improve usability.

2. Description of the Related Art

A screen mirroring technology generally refers to transmitting an image displayed on a current screen in one device (source device) to another device (sink device) without any change between two devices having an image displaying function. For example, the screen mirroring technology involves transmitting an image displayed on the source device 1 such as a mobile phone or a tablet to the sink device 2 such as a Television (TV) or a Personal Computer (PC), without any change and displaying the image in the sink device 2, as shown in FIG. 1.

Such a screen mirroring technology is generally used, for example, to output a game or a webpage image that is displayed in a terminal with a relatively small screen such as a portable terminal, to a larger screen. It is also possible to significantly expand the convenience for use, in particular, the utilization of the portable terminal through the screen mirroring technology.

Accordingly, many more portable terminals are now equipped with the screen mirroring technology such as "Wi-Fi Display" or "Mirroring AirPlay".

However, the battery consumption of the portable terminal is greatly increased when a mirroring screen operation and a media content reproduction are simultaneously performed.

SUMMARY OF THE INVENTION

Accordingly, an aspect of the present invention is to solve the above-mentioned problems occurring in the prior art, and to provide a more efficient screen mirroring method and apparatus.

Another aspect of the present invention is to provide a screen mirroring method and apparatus suitable for use with a portable terminal to reduce battery consumption and improve usability.

Yet another aspect of the present invention is to provide a screen mirroring method and apparatus which can effectively respond when a content reproduction operation is performed while a screen mirroring function is performed.

In accordance with an aspect of the present invention, there is provided a screen mirroring method of a source device, including determining whether a reproduction operation of media content is requested while a screen mirroring operation is performed, when the reproduction operation of the media content is requested, streaming the media content to a sink device, and stopping the reproduction operation of the media content.

In accordance with another aspect of the present invention, there is provided a source device for performing a screen mirroring operation, the apparatus including a display unit for displaying an execution image, an operation state, and a menu state of an application, a manipulator for receiving a user manipulation, a main communication unit for performing a wireless signal processing operation for a mobile communication function, a voice processor for processing a voice signal, a sub communication unit for performing wireless communication including an image data transmission according to the screen mirroring operation with a sink device, and a controller for controlling respective function units of the source device, wherein, when a reproduction operation of the media content is requested, the controller controls the sub communication unit to transmit the corresponding media content to a sink device by performing a content streaming operation without performing the reproduction operation of the corresponding media content.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
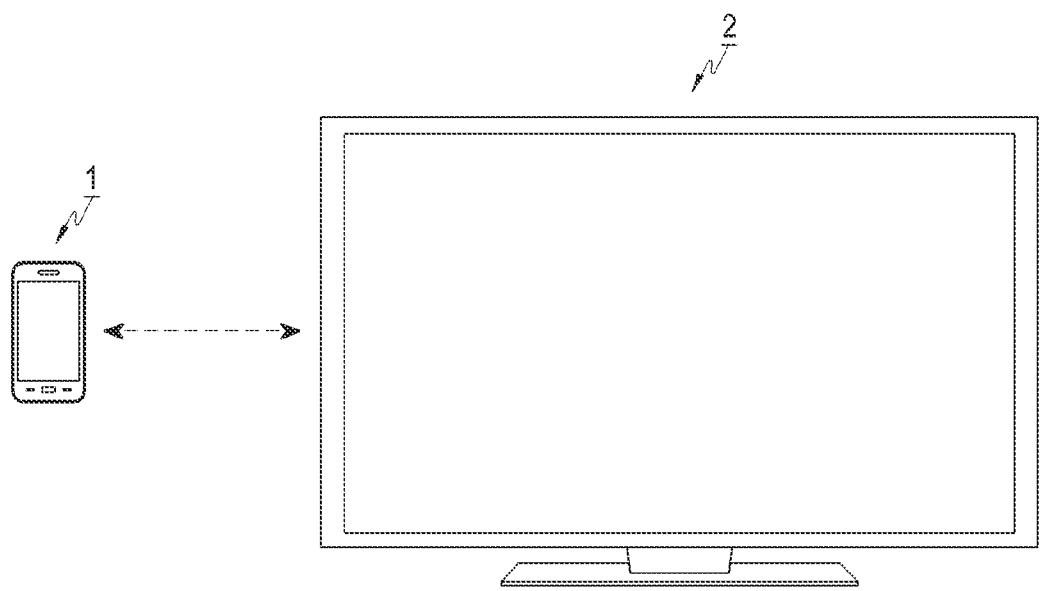
FIG. 1 illustrates exteriors of devices (a source device and a sink device) to which a screen mirroring technology is applied.

Hereinafter, embodiments of the present invention will be described with reference to the accompanying drawings. In the following description, like reference numerals refer to like elements, features and structures, throughout the drawings. Detailed description of known functions and structures is omitted to avoid obscuring the subject matter of the present invention.

Figure 2:
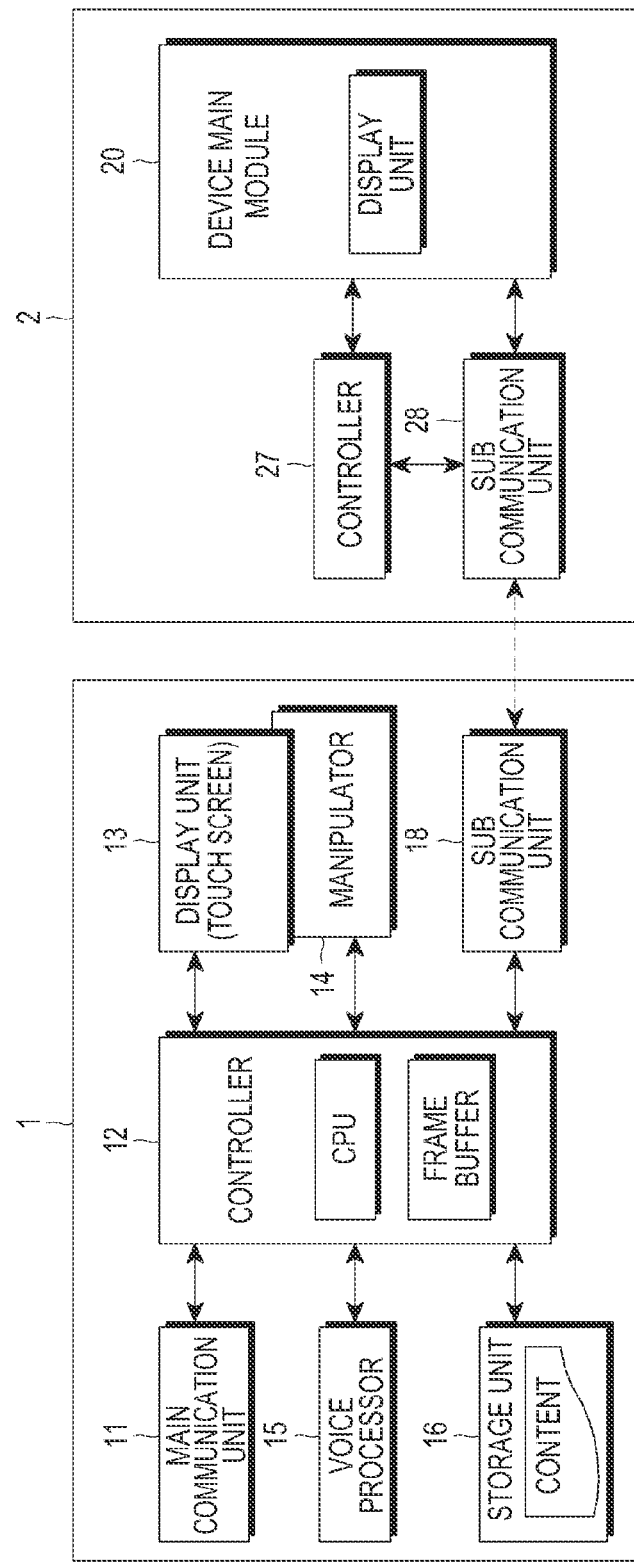
FIG. 2 illustrates the interior of a source device and a sink device for performing a screen mirroring function according to an embodiment of the present invention.

FIG. 2 illustrates the components of a source device and a sink device for performing a screen mirroring function according to an embodiment of the present invention. The source device 1 can be, for example, a portable terminal, and the sink device 2 can be, for example, a TV.

Referring to FIG. 2, the source device 1 generally includes a Liquid Crystal Display (LCD) screen to display execution images, various operation states, a menu state, etc. of various applications of the corresponding sink device 1. The source device 1 includes a display unit 13 which can be implemented in a touch screen structure, a manipulator 14 which includes a touch screen controller connected with the display unit 13 for receiving inputs of various touch screen manipulations by a user and includes buttons for manipulating a plurality of operations mechanically provided to a keypad, an outside housing of the corresponding device for receiving an input of a manipulation by the user, a main communication unit 11 for performing a wireless signal processing operation for a mobile communication function to allow the source device 1 to communicate with an outside mobile communication net, the main communication unit including an antenna for mobile communication, a voice processor 15, which includes a speaker, a microphone for receiving an input of a user's voice or outputting an audible sound to the user and outputting processing sounds corresponding to various operations or sounds corresponding to various digital audio contents and dynamic image contents, when a phone call according to a mobile communication function is performed, a sub communication unit 18, which includes Wireless Local Area Network (WLAN) equipment, a near field communication module for performing, for example, wireless communication including an image data transmission according to a mirroring operation with the sink device 2 based on a corresponding transport protocol such as a "Wi-Fi Display" standard, a controller 12 for controlling the overall operations of the corresponding source apparatus 1, and a storage unit 16 for storing such information as an operation program related to an operation of the controller 12, various applications, related contents or image data.

It is also conceivable that the source device 1 may further include function units, which are applied to the portable terminal, such as a power supply unit including a battery for charging, a camera unit, a Global Positioning System (GPS) unit, and a vibration motor.

The sink device 2 includes a sub communication unit 28, which includes Wireless Local Area Network (WLAN) equipment, a near filed communication module for performing wireless communication with (the sub communication unit of) the source device 1 according to a corresponding transport protocol, a controller 12 for controlling an operation of the sub communication unit 28 and converting a format of the image data according to the screen mirroring operation provided by the source device 1 to a format suitable for being processed in the corresponding sink device 2, and a main module 20, which includes basic equipment for performing a main function of the corresponding sink device 2, such as a TV function for displaying the image data according to the mirroring operation provided by the controller 12.

In the above description, the controller 12 of the source device 1 and the controller 27 of the sink device 2 perform the mirroring operation according to features of the present invention. When a reproduction operation of media content is requested while the screen mirroring operation is performed, the controller 12 of the source device 1 controls such that the corresponding media content is transmitted to the sink device 2 by performing a content streaming operation without performing the reproduction operation of the corresponding media content, and the controller 27 of the sink device 2 receives the transmitted media content to control such that the reproduction operation of the media content is performed.

Figure 3:
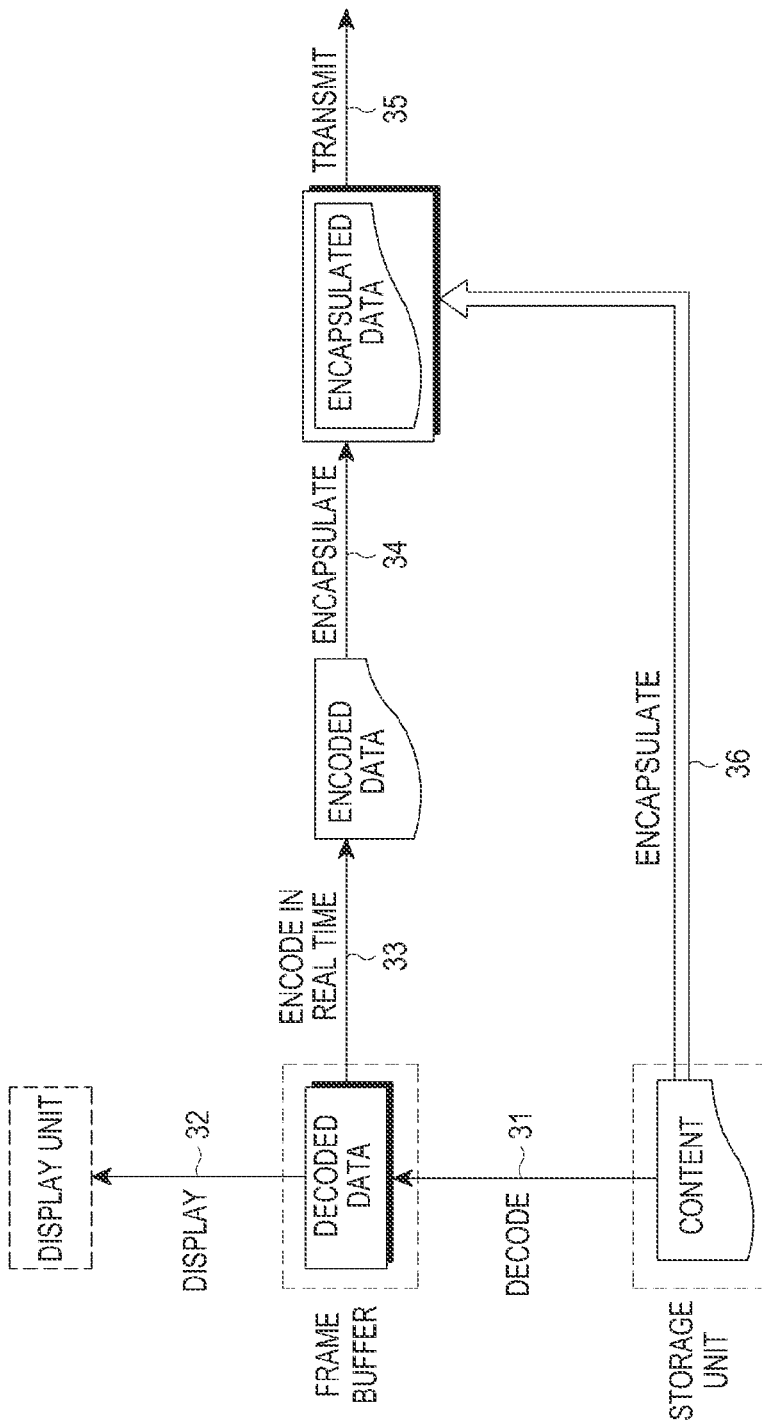
FIG. 3 illustrates a media content processing state when a screen mirroring function is performed according to an embodiment of the present invention.

FIG. 3 illustrates a media content processing state when a screen mirroring function is performed according to an embodiment of the present invention. When the mirroring operation is performed, the source device 1 encodes currently displayed data, which is recorded in a frame buffer, in real time in step 33, packetizes the encoded data and encapsulates the encoded data with a transport protocol in step 34, and transmits the encapsulated data to the sink device 2.

When the reproduction operation of the media content is simultaneously performed while the mirroring operation is performed, it is possible to decode content stored in the storage unit to record the content in the frame buffer in step 31, encode the data recorded in the frame buffer in real time in step 33 while displaying the data in step 32, encapsulate the data in step 34, and transmit the data in step 35.

However, performing the screen mirroring operation while the media content is reproduced increases battery consumption and burdens processing in the source device 1. Accordingly, when the media content is reproduced while the screen mirroring operation is performed in the source device 1, the screen mirroring is dynamically replaced with a content streaming manner and the content streaming is performed, which increases battery use time and improves usability of the source device 1.

The content streaming refers to a manner of transmitting (streaming or downloading and playing) a multimedia content file stored in a device such as a mobile phone, a tablet, or a PC, to a device such as a TV, and reproducing the transmitted multimedia content file. In the content streaming, the stored content file is encapsulated with a transport protocol and then transmitted. Then, the transmitted content file is received and reassembled in the device and then is decoded and reproduced. Such a content streaming is used to reproduce remotely stored content generated by a user or downloaded content.

In the present invention, when there is a request for content reproduction while the screen mirroring operation is performed in the source device 1, the source device 1 performs the content streaming operation without operating the screen mirroring operation by using such a content streaming manner. Referring back to FIG. 3 for description, when the content reproduction operation is requested while the screen mirroring operation is performed, only an operation of encapsulating the content stored in the storage unit and transmitting the encapsulated data in step 36 is performed. The aforementioned procedures of decoding the content to record the content in the frame buffer in step 31, displaying the data recorded in the frame buffer in step 32, encoding the data in real time in step 33, and encapsulating the encoded data in step 34 are not performed and omitted.

Once the screen mirroring operation according to the present invention is performed, an image of the content which is being reproduced in the source device 1 is not displayed during the content reproduction. However, since the corresponding content is reproduced and displayed in the sink device 2 and a particular manipulation of the device is not required in general while a multimedia content is reproduced, the screen mirroring operation according to the present invention does not restrict a particular function in an aspect of the user and is very useful in an aspect of the device resources.

Figure 4:
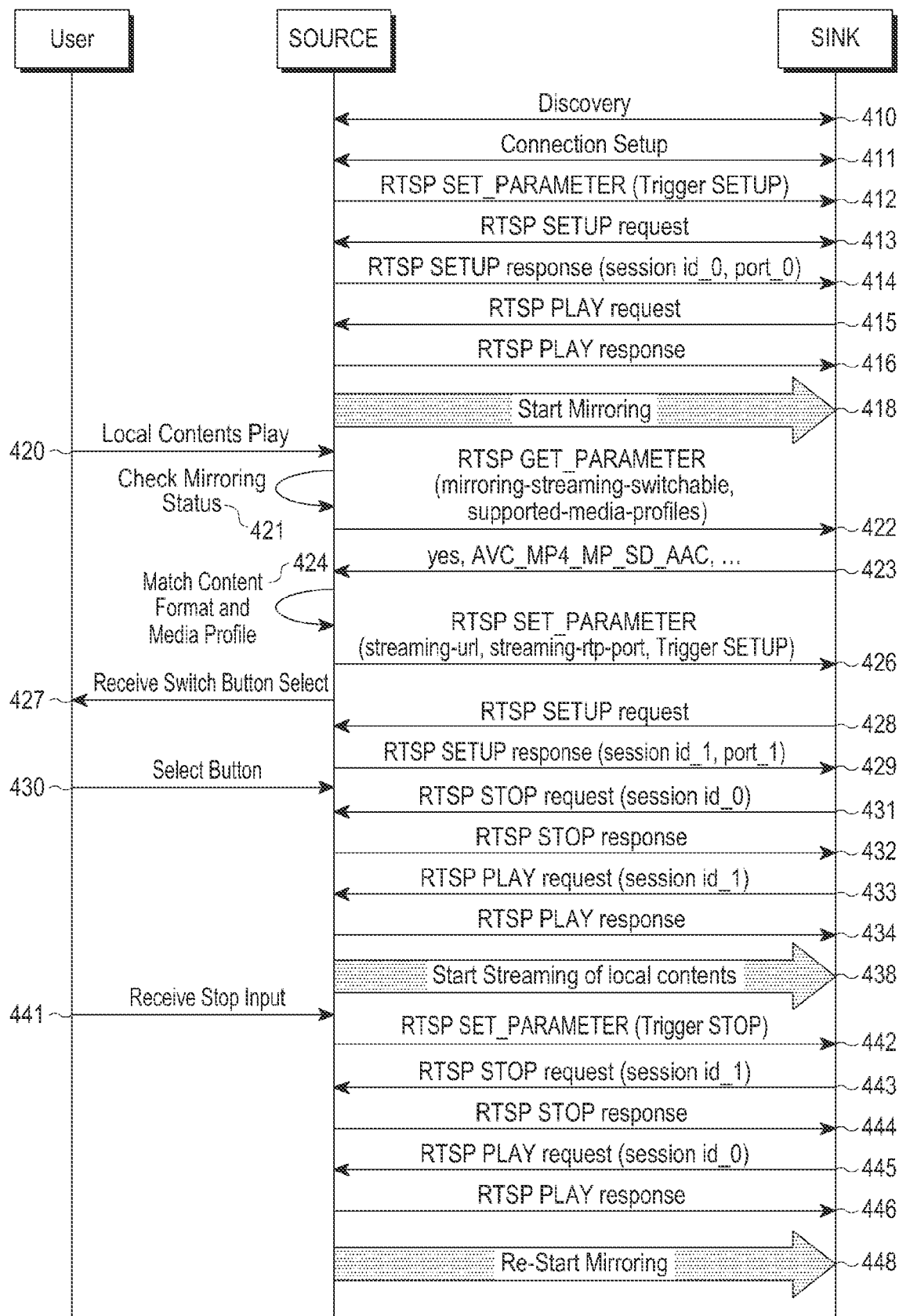
FIG. 4 illustrates in detail a screen mirroring function performed between devices according to an embodiment of the present invention.

FIG. 4 illustrates in detail a screen mirroring function performed between devices according to an embodiment of the present invention.

Respective sequential steps of FIG. 4 can be performed according to, for example, a Real Time Streaming Protocol (RTSP). The sequential steps 410 to 418 in FIG. 4 may also correspond to the general screen mirroring operation. Subsequent sequential steps 420 to 438 correspond to the content streaming performed when there is a request for the content reproduction while the screen mirroring operation according to the present invention is performed. Subsequent sequential steps 441 to 448 are for stopping the content streaming operation while the screen mirroring operation according to the present invention is performed.

Referring to respective steps 410 to 418 corresponding to performing the general screen mirroring operation, a device and service discovery operation is performed between the source device 1 and the sink device 2 in step 410, and then a connection setup operation is performed between the source device 1 and the sink device 2 in step 411. Then, the source device 1 triggers the setup to the sink device 2 by using a "SET_PARAMETER" method of the Real Time Streaming Protocol (RTSP) in order to generate a session in step 412. Next, the sink device 2 requests an RTSP "SETUP" to the source device 1 in step 413, and the source device 1 sends a response to the RTSP "SETUP" to the sink device 2 in step 415. At this time, a session ID and a port number are set (e.g. session_id_0, port 0), and the session is generated. The sink device 2 requests an RTSP "PLAY" to the source device 1 in step 415, the source device 1 sends a response to the RTSP "PLAY" to the sink device 2 in step 416, and then the screen mirroring operation is performed in step 418.

Referring to respective steps 420 to 438 corresponding to the procedures of the content streaming performed during the screen mirroring operation, if there is a manipulation for reproducing the content by the user in the source device 1 in step 420, the source device 1 obtains related Application Programming Interface (API) information and determines whether a current screen mirroring function is in an active status in step 421. Then, the source device 1 requests information on whether a mirroring/streaming switching is supported and information on a media profile supporting the mirroring/streaming switching by using a "GET_PARAMETER" method of the RTSP in order to determine whether the sink device 2 supports a content streaming conversion in step 422, and the sink device 2 provides corresponding information to the source device 1 in response to the request in step 423. The sink device 2 can support the mirroring/streaming switching (yes), and informs the source device 1 of such information as Advanced Video Coding (AVC), MPEG-Layer Audio 4 (MP4), MP, SD, and Advanced Audio Coding (AAC), as the information on the media profile supporting the mirroring/streaming switching.

A parameter for the information on whether the mirroring/streaming switching is supported is not defined in the "GET_PARAMETER" method of the RTSP, but the corresponding parameter can be added according to the present invention. Thereafter, the source device 1 matches a format of the content to be streamed according to the rendering capability and a format according to the media profile which can be supported in the sink device 2 in step 424.

Steps 421 to 424 may correspond to steps for determining whether the current mirroring function is activated, whether the sink device 2 supports the content streaming conversion, and whether the sink device 2 can decode (reproduce) the format of the streaming content. When conditions in the above steps are not satisfied, only the general screen mirroring function is performed without performing the content streaming operation according to the present invention. When the conditions are all satisfied, a session for the content streaming is additionally generated and the session is switched as discussed in the following description.

That is, the source device 1 sets a parameter for receiving a request for the content streaming in the sink device 2 in step 426. For example, the source device 1 sets such parameters as streaming-url and streaming-rtp-port, by using the SET_PARAMETER method of the RTSP, and triggers the setup to the sink device 2.

The source device 1 can operate such that switch items for receiving an input of a manipulation for selecting operations (through a touch screen input) in addition to a preset appropriate manipulation guide message are displayed in the display unit, for receiving a manipulation of whether the streaming operation is performed from the user in step 427. For example, the displayed manipulation guide message may be "Do you want to change the screen mirroring into the streaming operation? [yes][no]", and contents for describing the corresponding operation more easily for a general user can be further added. Such an operation performed in step 427 is only an illustrative implementation for selectively receiving the manipulation of whether to perform the streaming operation during the screen mirroring operation from the user.

In subsequent steps, a session switching operation for the streaming is performed in the screen mirroring, that is, the sink device 2 requests an RTSP "SETUP" to the source device 1 in step 428, and the source device 1 sends a response to the RTSP "SETUP" to the sink device 2. At this time, a new session ID and a port number are set (e.g. session_id_1, port_1) and the session is generated. Then, the source device 1 determines whether there is a selection manipulation for performing the streaming operation by the user, and performs a subsequent operation in step 430. If the user does not select the streaming operation, the streaming operation is not performed.

In step 431, the sink device 2 requests, for example, an RTSP "STOP" to the source device 1 with a session (session id_0) formed for the screen mirroring in order to stop the screen mirroring. Accordingly, the source device 1 sends a response to the RTSP "STOP" to the sink device 2 in step 432. Then, the sink device 2 requests an RTSP "PLAY" with a newly formed session (session id_1) for the streaming in step 433, and the source device 1 sends a response to the RTSP "PLAY" to the sink device 2 in step 434, and the streaming operation is performed in step 438. At this time, the source device 1 stops the reproduction of the media content and can display an appropriately preset message, which informs that the screen mirroring has been changed into the streaming operation, on the screen. Further, when the sink device 2 receives a session switching instruction through the above steps, the sink device 2 receives the streamed content from the source device 1 and successively reproduces the content in a seamless video.

Referring to respective steps 441 to 448 corresponding to the procedures of stopping the content streaming operation during the screen mirroring operation, when there is a manipulation for stopping the content reproduction by the user as defined in step 441 or the content reproduction is completed, the source device 1 triggers a "STOP" to the sink device 2 by using the "SET_PARAMETER" method of the RTSP for the session stop in step 442. Then, the sink device 2 requests the RTSP "STOP" to the source device 1 in order to stop the streaming operation with the streaming session (session id_1) in step 443, the source device 1 sends a response to the RTSP "STOP" to the sink device 2 in step 444, and the streaming operation is stopped. The sink device 2 requests the RTSP "PLAY" to the source device 2 in order to perform the screen mirroring with the screen mirroring session (session id_0) in step 445, the source device 1 sends a response to the RTSP "PLAY" to the sink device 2 in step 446, and the screen mirroring operation is performed again in step 448.

Although the above description has been described with reference to specific embodiments of the present invention, various embodiments or their variations can be used.

For example, the above description describes that the user can selectively input a manipulation of whether to switch the screen mirroring operation to the streaming operation during the screen mirroring operation as defined in step 427. However, the streaming operation can be automatically performed without user manipulation, and the user can also preset the manipulation through a menu item for a separate function setup.

Further, when the user does not select to switch the screen mirroring to the content streaming operation in step 427, the source device 1 stores the content in the frame buffer by decoding the content stored in the storage unit, and can perform the operation of directly encapsulating the content stored in the storage unit and transmitting the content to the sink device 2 while performing the operation of displaying the data stored in the frame buffer, that is, the operation of reproducing the content. Therefore, at least the real time encoding operation performed in step 33 of FIG. 3 can be omitted.

As described above, the screen mirroring operation according the present invention is suitable for the portable terminal due to its ability to reduce battery consumption and improve usability, and can more effectively handle content reproduction operation being performed simultaneously with the screen mirroring function.

While the present invention has been shown and described with reference to various embodiments thereof, it will be understood by those of ordinary skill in the art that changes in form and detail may be made without departing from the spirit and scope of the present invention as defined by the appended claims.

What is claimed is:

1. A method for transmitting data to a sink device by a source device using a mirroring mode or a streaming mode, the method comprising:
    establishing, by a processor of the source device, a wireless fidelity display (WFD) session for the mirroring mode with the sink device;
    in the mirroring mode, identifying, by the processor, a playback of a media content;
    in response to identifying the playback of the media content in the mirroring mode, determining, by the processor, that the streaming mode for the media content is supported by the sink device and transmitting, by the processor, to the sink device, a first request message for setting at least one parameter corresponding to the media content;
    after transmitting the first request message, providing, by the processor, the media content to the sink device using the streaming mode which is switched from the mirroring mode;
    in response to identifying, by the processor, a stop of the playback of the media content while providing the media content using the streaming mode, switching, by the processor, to the mirroring mode from the streaming mode,
    wherein, in the mirroring mode, the processor decodes the media content and plays the decoded media content,
    wherein, in the mirroring mode, the media content is encoded and provided, by the processor, to the sink device while the source device simultaneously displays the media content, and
    wherein, in the streaming mode, the media content is provided, by the processor, to the sink device without decoding and encoding the media content.

2. The method of claim 1, further comprising:
    in response to identifying the playback of the media content in the mirroring mode and identifying that the streaming mode for the media content is not supported by the sink device, providing, by the processor, the media content to the sink device using the mirroring mode.

3. A source device for transmitting data to a sink device using a mirroring mode or a streaming mode, the source device comprising:
    a transceiver; and
    a processor coupled to the transceiver,
    wherein the processor is configured to:
        establish a wireless fidelity display (WFD) session for the mirroring mode with the sink device;
        in the mirroring mode, identify a playback of a media content;
        in response to identifying the playback of the media content in the mirroring mode, determine that the streaming mode for the media content is supported by the sink device, and transmit, to the sink device, a first request message for setting at least one parameter corresponding to the media content, and
        after transmitting to the first request message, provide the media content to the sink device using the streaming mode which is switched from the mirroring mode,
        in response to identifying a stop of the playback of the media content while providing the media content using the streaming mode, switch to the mirroring mode from the streaming mode,
    wherein, in the mirroring mode, the media content is decoded and played,
    wherein, in the mirroring mode, the media content is encoded and provided to the sink device while the source device simultaneously displays the media content, and
    wherein, in the streaming mode, the media content is provided to the sink device without decoding and encoding the media content.

4. The source device of claim 3, wherein the processor is further configured to:
    in response to identifying the playback of the media content in the mirroring mode and identifying that the streaming mode for the media content is not supported by the sink device, provide the media content to the sink device using the mirroring mode.

5. The source device of claim 3, wherein the media content to be provided using the streaming mode is encoded by the source device in real time.

6. The method of claim 1, wherein the media content to be provided using the streaming mode is encoded by the source device in real time.

7. The method of claim 1, further comprising:
    transmitting, by the processor, to the sink device, a second request message for information related to media file formats supported by the sink device; and
    in response to the second request message, receiving, by the processor, from the sink device, a response message including the information related to the media file formats supported by the sink device,
    wherein the response message includes a list of the media file formats supported by the sink device and information indicating whether the streaming mode is supported by the sink device.

8. The method of claim 7, wherein whether the streaming mode for the media content is supported by the sink device is identified based on the response message.

9. The source device of claim 3, wherein the processor is further configured to:
    transmit, to the sink device, a second request message for information related to media file formats supported by the sink device; and in response to the second request message, receive, from the sink device, a response message including the information related to the media file formats supported by the sink device, wherein the response message includes a list of the media file formats supported by the sink device and information indicating whether the streaming mode is supported by the sink device.

10. The source device of claim 9, wherein whether the streaming mode for the media content is supported by the sink device is identified based on the response message.

* * * * *